(12) United States Patent
Fong (10) Patent No.: US 7,431,484 B2
(45) Date of Patent: Oct. 7, 2008

(54) EMBROIDERED INSTRUMENT CLUSTER

(75) Inventor: Ching Fong, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 216 days.

(21) Appl. No.: 11/073,487

(22) Filed: Mar. 4, 2005

(65) Prior Publication Data

US 2006/0198117 A1    Sep. 7, 2006

(51) Int. Cl.
B60Q 3/04    (2006.01)

(52) U.S. Cl. .............. 362/489; 362/23; 362/488

(58) Field of Classification Search ............ 362/84, 362/570, 582, 26, 489, 551, 554, 556, 559, 362/812, 28–30, 23, 511; 40/541, 552; 116/286, 116/310, DIG. 5, DIG. 26, DIG. 36, 334
See application file for complete search history.

(56) References Cited

U.S. PATENT DOCUMENTS

| | | | |
|---|---|---|---|
| 1,672,485 A | | 6/1928 | Dunand |
| 3,738,299 A | | 6/1973 | Packler et al. |
| 3,761,675 A | * | 9/1973 | Mason et al. ......... 219/121.67 |
| 4,234,907 A | * | 11/1980 | Daniel ..................... 362/556 |
| 4,584,785 A | | 4/1986 | von Danwitz |
| 4,727,603 A | * | 3/1988 | Howard ..................... 2/115 |
| 4,841,155 A | * | 6/1989 | Ushida et al. ............ 250/463.1 |
| 4,935,850 A | * | 6/1990 | Smith, Jr. ................... 362/27 |
| 5,662,055 A | * | 9/1997 | Hartwig et al. ............ 112/102.5 |
| 5,753,381 A | * | 5/1998 | Feldman et al. ............ 428/696 |
| 6,116,745 A | | 9/2000 | Yei |
| 6,237,266 B1 | * | 5/2001 | Tassey et al. ................ 40/542 |
| 6,311,350 B1 | | 11/2001 | Kaiserman et al. |
| 6,499,421 B1 | | 12/2002 | Honigsbaum |
| 6,499,852 B1 | * | 12/2002 | Kino et al. ..................... 362/23 |
| 6,508,562 B1 | | 1/2003 | Venkatram et al. |
| 6,542,133 B1 | | 4/2003 | Kelman et al. |
| 6,568,345 B1 | | 5/2003 | Paulo |
| 6,663,252 B1 | | 12/2003 | Fong et al. |
| 6,729,738 B2 | * | 5/2004 | Fuwausa et al. ............. 362/84 |
| 6,778,074 B1 | * | 8/2004 | Cuozzo ..................... 340/441 |
| 2002/0092218 A1 | | 7/2002 | Black |
| 2002/0113455 A1 | | 8/2002 | Mungia |
| 2003/0164630 A1 | | 9/2003 | McKinney et al. |
| 2004/0066644 A1 | * | 4/2004 | Chang ....................... 362/23 |
| 2004/0105278 A1 | | 6/2004 | Currie et al. |
| 2004/0213088 A1 | * | 10/2004 | Fuwausa .................... 368/228 |
| 2006/0024476 A1 | * | 2/2006 | Leland et al. .............. 428/137 |
| 2006/0087832 A1 | * | 4/2006 | Peng et al. ................. 362/103 |

FOREIGN PATENT DOCUMENTS

JP    03274417 A    * 12/1991

* cited by examiner

*Primary Examiner*—Jong-Suk (James) Lee
*Assistant Examiner*—Robert May
(74) *Attorney, Agent, or Firm*—Harness, Dickey & Pierce, P.L.C.

(57) ABSTRACT

An instrument cluster generally including a backing material and a plurality of fibers forming indicia that indicate a vehicle parameter. The plurality of fibers is coupled to the backing material. The instrument cluster also includes an illumination device that illuminates at least one of the backing material and the plurality of fibers.

22 Claims, 10 Drawing Sheets

EMBROIDERED INSTRUMENT CLUSTER

FIELD OF THE INVENTION

The present invention relates to an instrument cluster in a vehicle dashboard and more particularly relates to an instrument cluster having indicia embroidered thereon.

BACKGROUND OF THE INVENTION

In previous implementations of instrument clusters, a plurality of appliqués is required to produce the typical appearance of the instrument cluster as seen in many vehicles. The plurality of appliqués can be screen-printed, can require complicated forming techniques and relatively large amounts of ink and pigment. The appliques also can require additional tooling for each of the many colors in the instrument cluster. Moreover, any change in a graphic configuration requires a change in tooling. In one example, the plurality of appliqués can require as much as twenty separate and specific tools to provide the typical colors and graphical complexities found in the instrument cluster. As such, the previous implementations of instrument clusters can require complex and intricate processes and tooling, which may add additional cost and time to the assembly process.

SUMMARY OF THE INVENTION

An instrument cluster that generally includes a backing material and a plurality of fibers forming indicia. The indicia may indicate a vehicle parameter. The plurality of fibers is coupled to the backing material. The instrument cluster also includes an illumination device that illuminates the backing material and/or the plurality of fibers.

Further areas of applicability of the present invention will become apparent from the detailed description provided hereinafter. It should be understood that the detailed description and specific examples, while indicating the various embodiments of the present invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

DETAILED DESCRIPTION OF THE VARIOUS EMBODIMENTS

The following description of the various embodiments is merely exemplary in nature and is in no way intended to limit the present invention, its application or uses.

Figure 1:
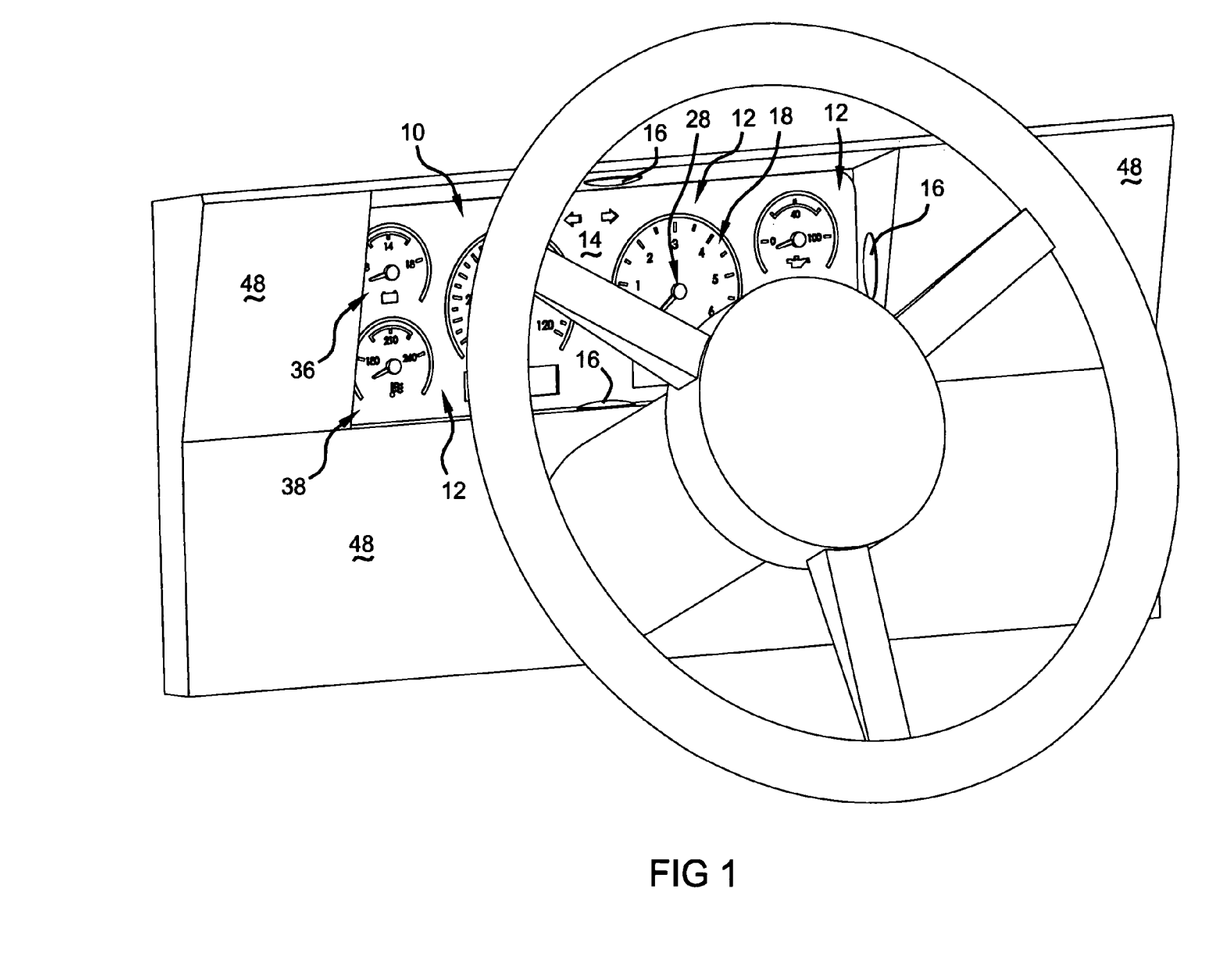
FIG. 1 is a perspective view of an instrument cluster constructed in accordance with the teachings of the present invention showing the instrument cluster mounted in a portion of a dashboard.
Figure 2:
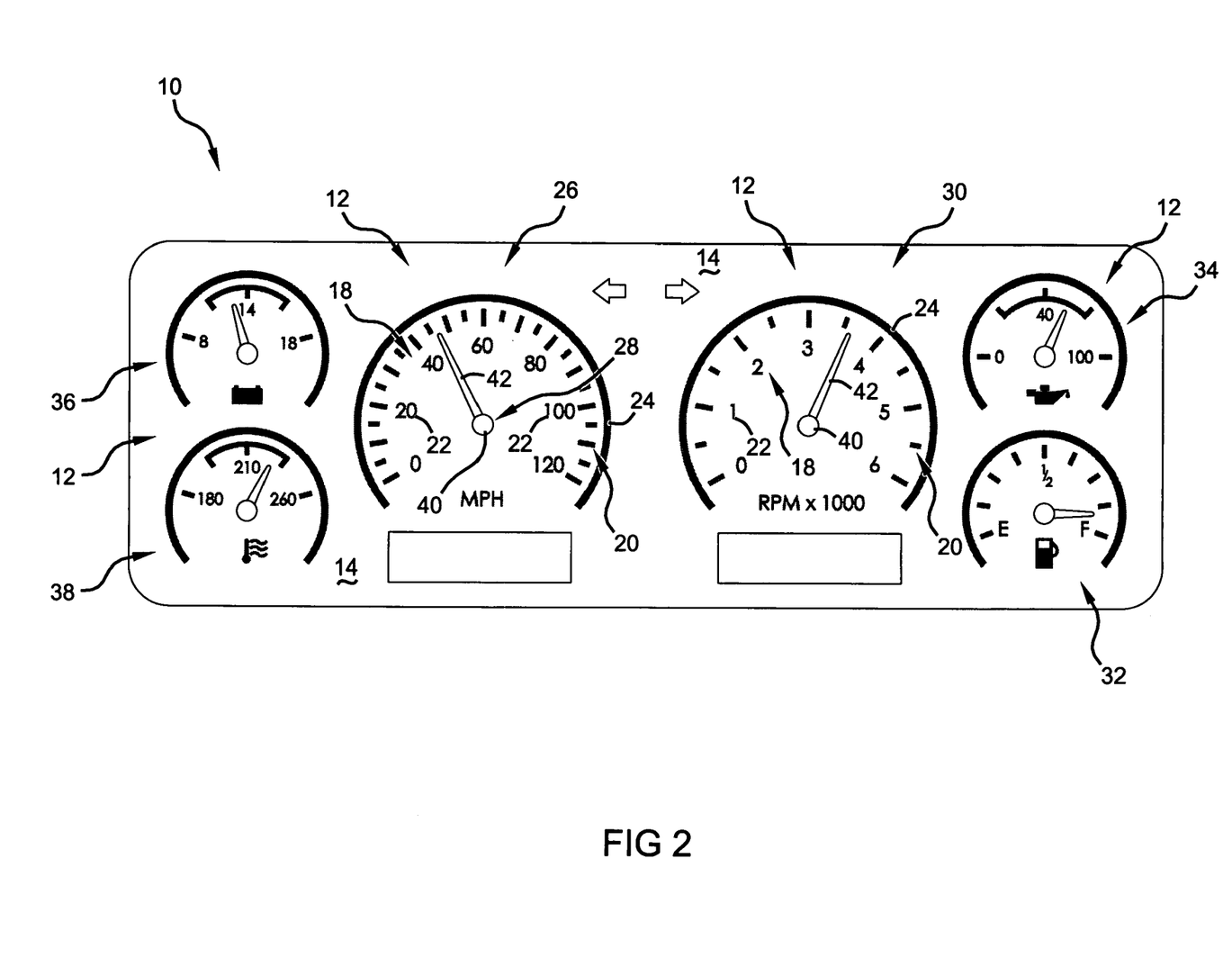
FIG. 2 is a front view of the instrument cluster of FIG. 1 and shows the instrument cluster having indicia formed of a plurality of fibers embroidered to a backing material.
Figure 3:
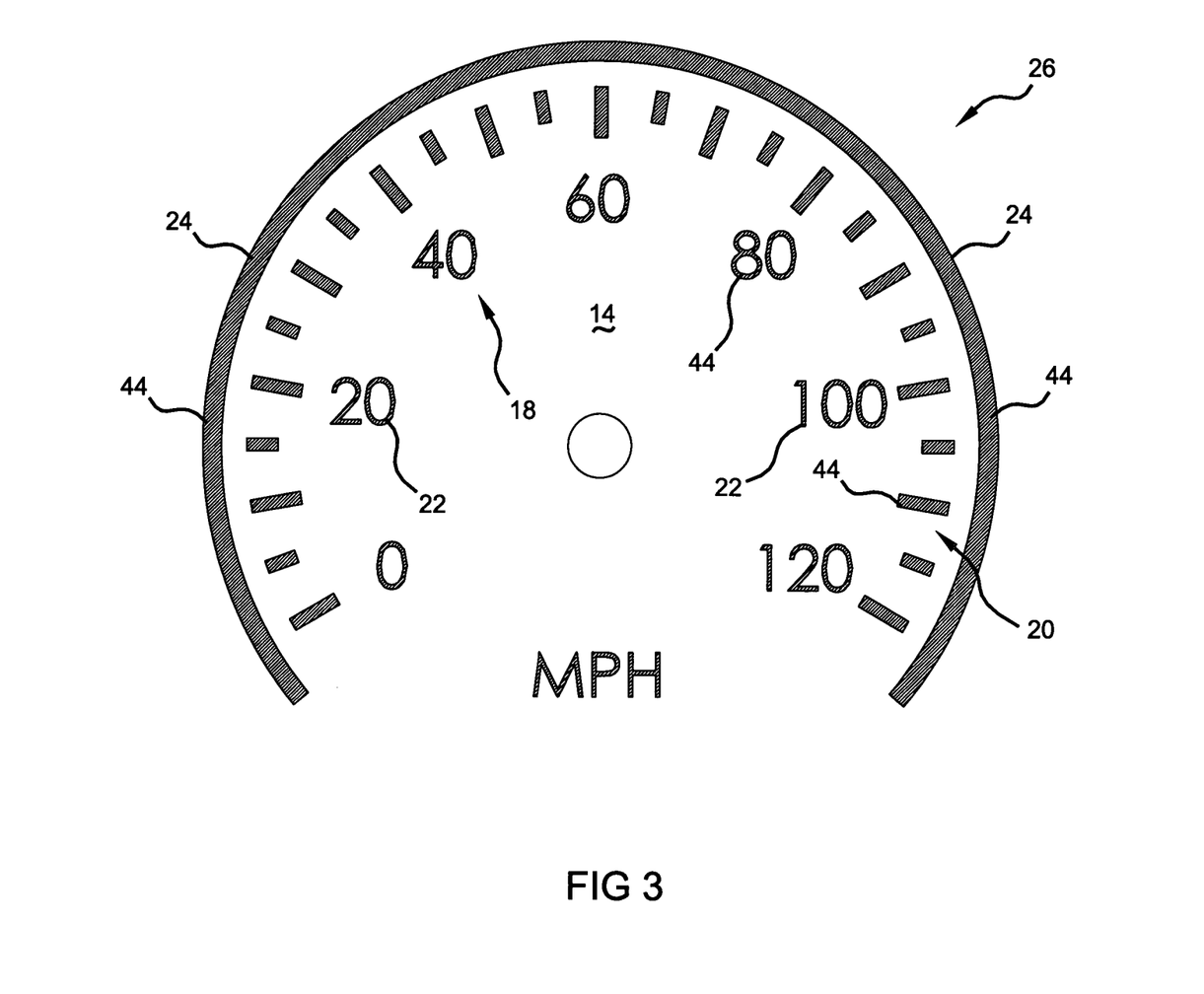
FIG. 3 is a front view of one instrument of the instrument cluster mounted to the backing material showing the plurality of fibers embroidered thereon.

With reference to FIGS. 1, 2 and 3, an embroidered instrument cluster 10 is shown constructed in accordance with the teachings of the present invention. The embroidered instrument cluster 10 includes a plurality of instruments or gauges 12. The instruments or gauges 12 may be formed on a backing material 14. The instruments 12 and/or the backing material 14 may be illuminated by one or more illumination devices 16. Each of the gauges 12 include a plurality of dial face indicia 18 that may include the tick marks 20, characters 22 and/or borders 24. For example, one of the gauges 12 may be a speedometer 26. The speedometer 26 may include tick marks 20, a plurality of the characters 22 (i.e., numbers and/or letters) that indicate a speed scale (e.g., 10, 20, 30 etc.) and a pointer 28 that is rotatable relative to the tick marks 20 and the characters 22 to thus indicate a vehicle speed. The speedometer 26 may also include the border 24 that may demarcate the speedometer 26 from other gauges 12 on the embroidered instrument cluster 10.

The embroidered instrument cluster 10 may also include a tachometer 30, a fuel gauge 32, an oil pressure gauge 34, a battery voltage gauge 36 and/or an engine temperature gauge 38. It will be appreciated that the above-listed gauges in the embroidered instrument cluster 10 may function and/or be constructed in a similar manner to the speedometer 26 but otherwise indicate the respective vehicle parameters.

The rotatable pointer 28 may include a hub portion 40 and a needle portion 42. The needle portion 42 may rotate with the hub portion 40 relative to the characters 22 and/or the tick marks 20, as above described. The needle portion 42 and/or the hub portion 40 may be illuminated by the plurality of illumination devices 16. In other examples, the needle portion 42 and/or the hub portion 40 may be illuminated by a secondary illumination device (not shown), which may be located behind the hub portion 40, in a manner well known in the art.

Figure 7:
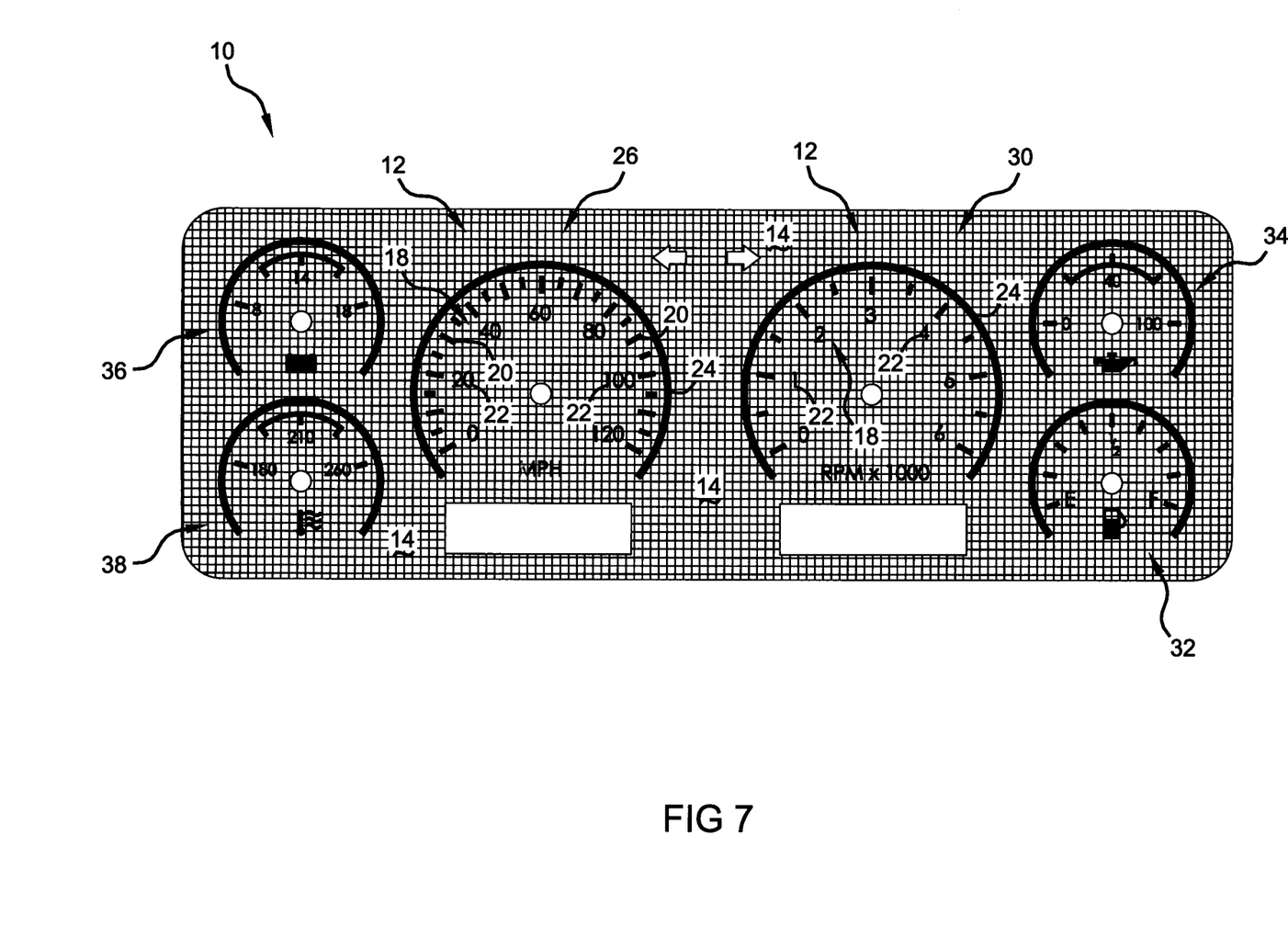
FIG. 7 is a front view of an alternative embodiment of the embroidered instrument cluster constructed in accordance with the teachings of the present invention showing an alternative backing material.
Figure 8:
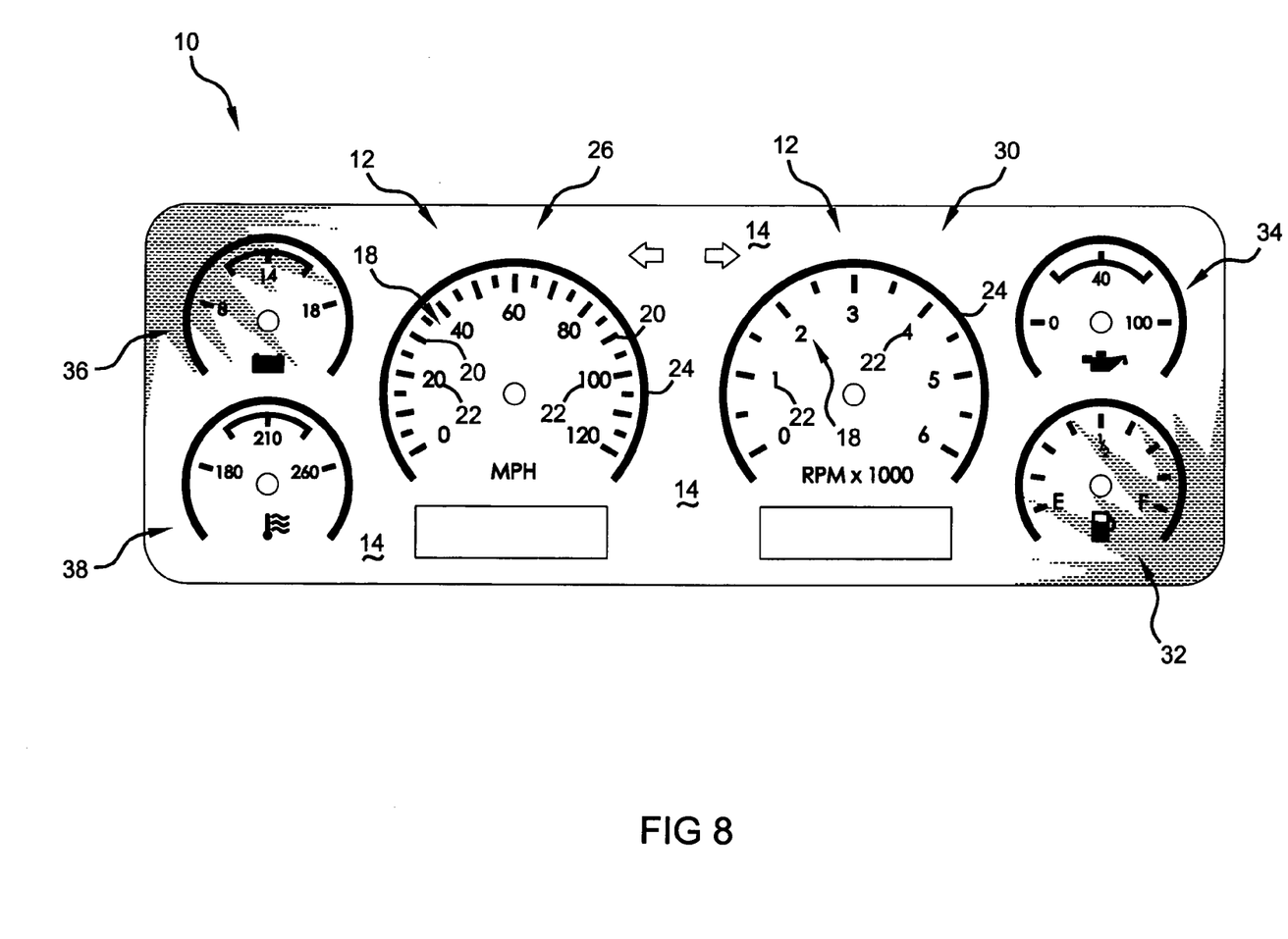
FIG. 8 is a front view of an alternative embodiment of the embroidered instrument cluster constructed in accordance with the teachings of the present invention showing a alternative backing material.

The backing material 14 may be made out of any embroiderable material or combination of materials, some examples of which include but are not limited to, cloth (FIG. 8), leather and/or synthetic materials. Other examples may include, but are not limited to, silk, cotton, cork, wool, satin, wood, velour, velvet, leather of various animal hides, woven wire (FIG. 7), poly vinyl chloride layers and/or pleather (i.e., synthetic leather). The backing material 14 may include many materials or combinations thereof, onto which the plurality of the tick marks 20, the characters 22 and/or the borders 24 may be embroidered.

Figure 4:
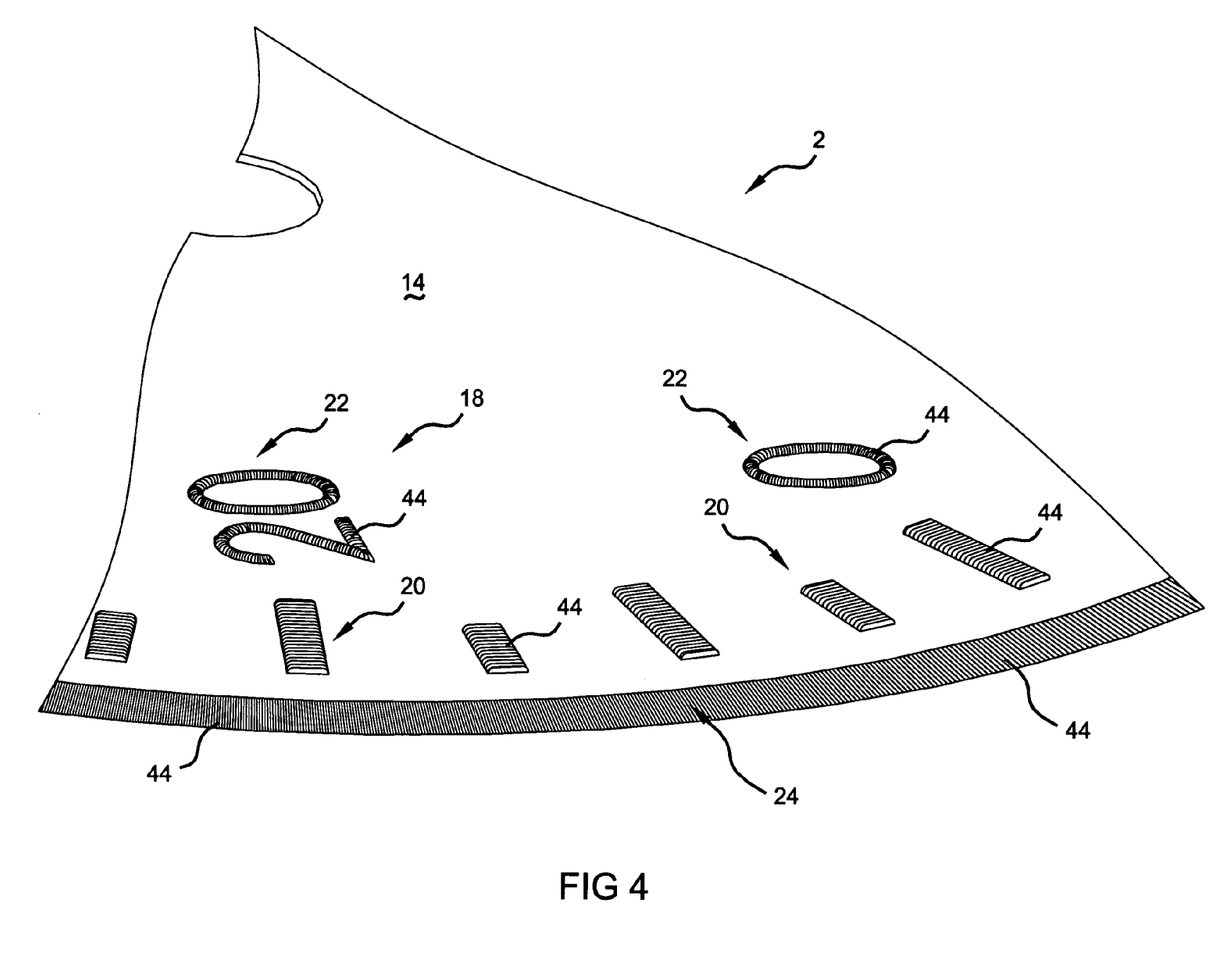
FIG. 4 is an exploded perspective view of the instrument from FIG. 3 showing the plurality of fibers.
Figure 9:
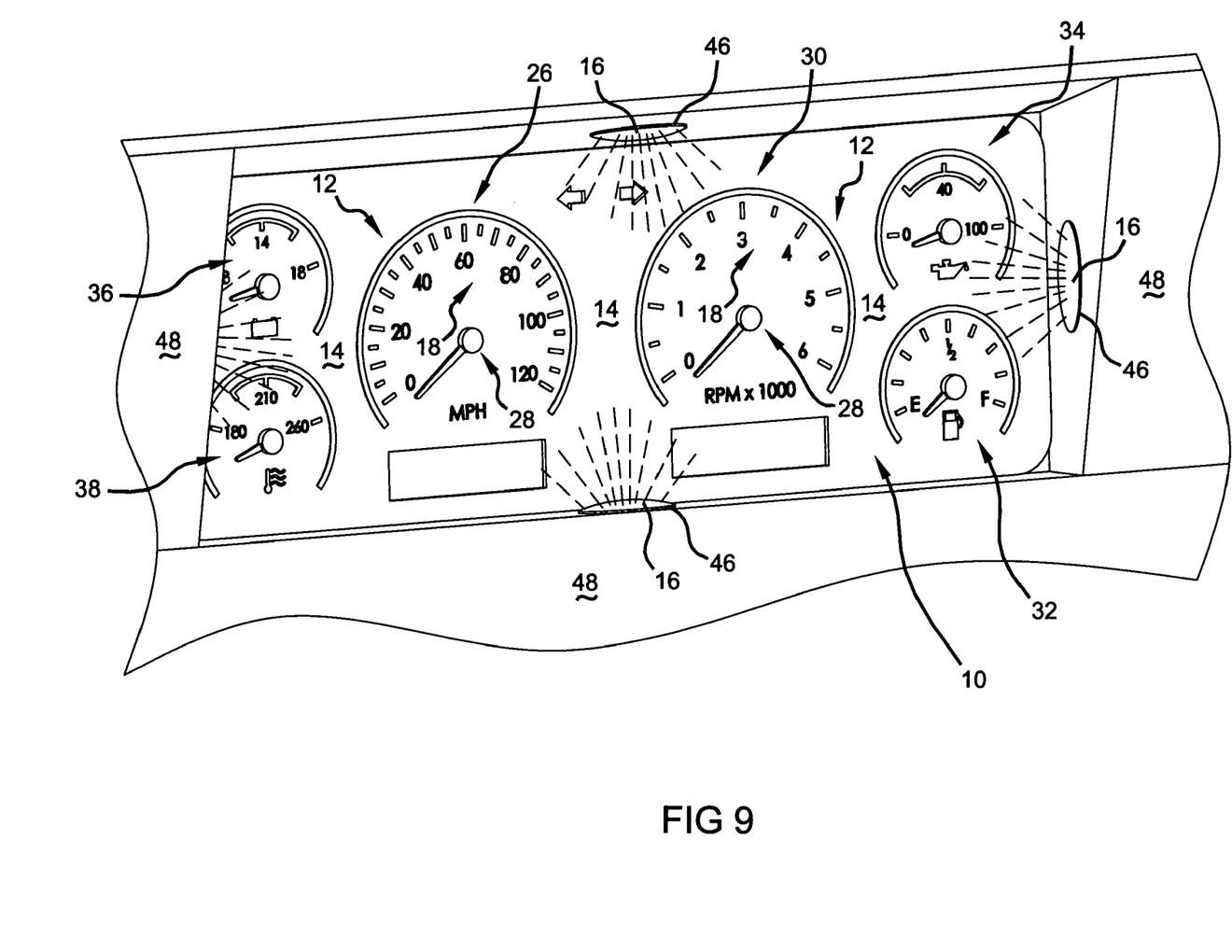
FIG. 9 is partial perspective view of the dashboard of FIG. 1 showing four illumination devices illuminating the instrument cluster.

With reference to FIG. 4, the plurality of indicia 18 (i.e., the tick marks 20, the characters 22 and/or the borders 24) may made of a plurality of fibers 44 that may be embroidered onto the backing material 14. The plurality of fibers 44 may be made of one more types of thread. The thread may be configured to specifically luminesce, fluoresce, phosphoresce and combinations thereof, when illuminated by the one or more illumination devices 16 (FIG. 9). It will be appreciated that the plurality of indicia 18 (i.e., the tick marks 20, the characters 22 and/or the borders 24) may be made of a single fiber that may be embroidered onto the backing material 14. In an alternative example, the thread may not be specifically configured to fluoresce or phosphoresce, but may do so (e.g., the thread contains inherent properties that cause it fluoresce or phosphoresce) when exposed to the one or more illumination devices 16 (albeit with less intensity relative to the thread specifically configured to do so).

The plurality of fibers 44 may be made of one or more types of thread and the backing material 14 may be made of any embroiderable material or combination of materials. In one example, the thread and/or the backing material may luminesce when exposed to light from an illumination device. By way of the above example, the thread and/or backing material may emit light due to exposure from light (i.e., reflect the light from the illumination device). In another example, the thread and/or the backing material may fluoresce when exposed to light from an illumination device. By way of the above example, the thread and/or backing material may emit light as the immediate result of and only during the absorption of radiation (i.e., light) from some the illumination device. In another example, the thread and/or the backing material may phosphoresce when exposed to light from an illumination device. By way of the above example, the thread and/or backing material may luminesce and continue to luminesce with a rate of decay after light from the illumination source ceases (e.g., light from the illumination device is turned off). The illumination device, in any of the above examples, may emit white light or may emit filtered light of a certain wavelength (e.g. UVA from a black light). Moreover, sunlight may serve to illuminate the threads and/or backing material 14.

With reference to FIG. 9, the one or more illumination devices 16 may be any suitable light generating device that may illuminate the backing material 14 and/or the plurality of indicia 18 embroidered thereon. In one example, each illumination device 16 may be an incandescent bulb (not specifically shown) received in a housing 46 on a dashboard 48. A portion of the housing 46 may be transparent to light from the incandescent bulb, while other portions may be opaque allowing the light to illuminate the embroidered instrument cluster 10 but not shine into a driver's or other passenger's eyes (not shown).

In one example, the one or more illumination devices 16 may include one or more filters (e.g., a dichroic filter and/or a colored filter) to filter out certain wavelengths. By way of the above example, the filter (not shown) may filter the certain wavelengths to more effectively cause the backing material 14 and/or the plurality of indicia 18 to fluoresce and/or phosphoresce. The filter, for example, may pass electromagnetic waves in the UVA region (i.e., about 320 nm to about 400 nm). UVA energy may cause the backing material 14 and/or the plurality of indicia 18 to fluoresce or phosphoresce more than if illuminated by unfiltered white light (e.g., an unfiltered incandescent bulb). In other examples, a fluorescent light may be used in lieu of or in combination with the illumination devices 16. The fluorescent light may be configured with phosphors that luminesce in the UVA spectrum. A suitable fluorescent light may be obtained from Osram Sylvania. The illumination device 16 may be configured such that light from the illumination device may not be perceivable by the human eye, while only the light emitted by the threads and/or backing material 14 may be perceivable by the human eye.

Figure 10:
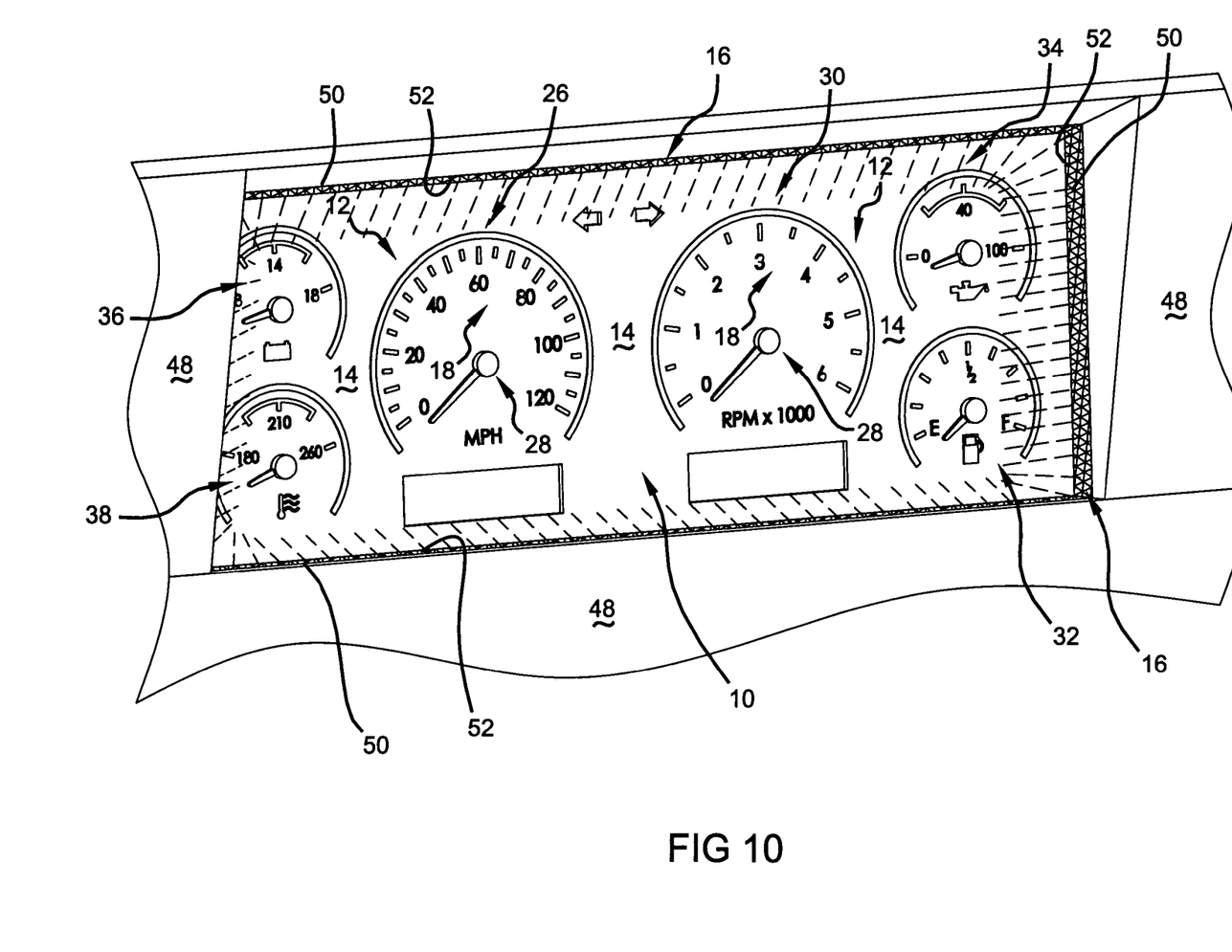
FIG. 10 is similar to FIG. 9 and shows an integral illumination device around a periphery of the instrument cluster that illuminates the instrument cluster.

In one example and with reference to FIG. 10, the one more illumination devices 16 may be a plurality of lighting elements 50 coupled to a periphery 52 of the embroidered instrument cluster 10. The plurality of lighting elements 50 may illuminate the backing material 14 and the plurality of indicia 18. The plurality of lighting elements 50 may be incandescent bulbs and/or light-emitting diodes (LEDs) (e.g., a rope light). In another example, the LEDs may generate specific wavelengths (e.g., UVA) that may more effectively cause the backing material 14 and/or the plurality of indicia 18 to phosphoresce or fluoresce. In a further example, the plurality of lighting elements 50 having a plurality of incandescent lights may also have a UV filter to more effectively cause the backing material 14 and/or the plurality of indicia 18 to phosphoresce or luminesce, as above described.

In one example, the backing material 14 may fluoresce or phosphoresce when illuminated by the one or more illumination devices 16 but the plurality of indicia 18 may only be illuminated (i.e., reflect light but not fluoresce and/or phosphoresce). To that end, the backing material 14 would glow while the plurality of indicia 18 would not glow (or glow less), thus providing a contrast between the two. By way of the above example, the backing material 14 may be a canvas or other suitable fabric having a generally white appearance that may fluoresce when illuminated by the one or more illumination devices 16. The plurality of indicia 18 may be a black thread (or other suitable contrasting color). The one or more illumination devices 16 will only illuminate the black thread but the white canvas will fluoresce, thus providing the contrast between the two.

Figure 6:
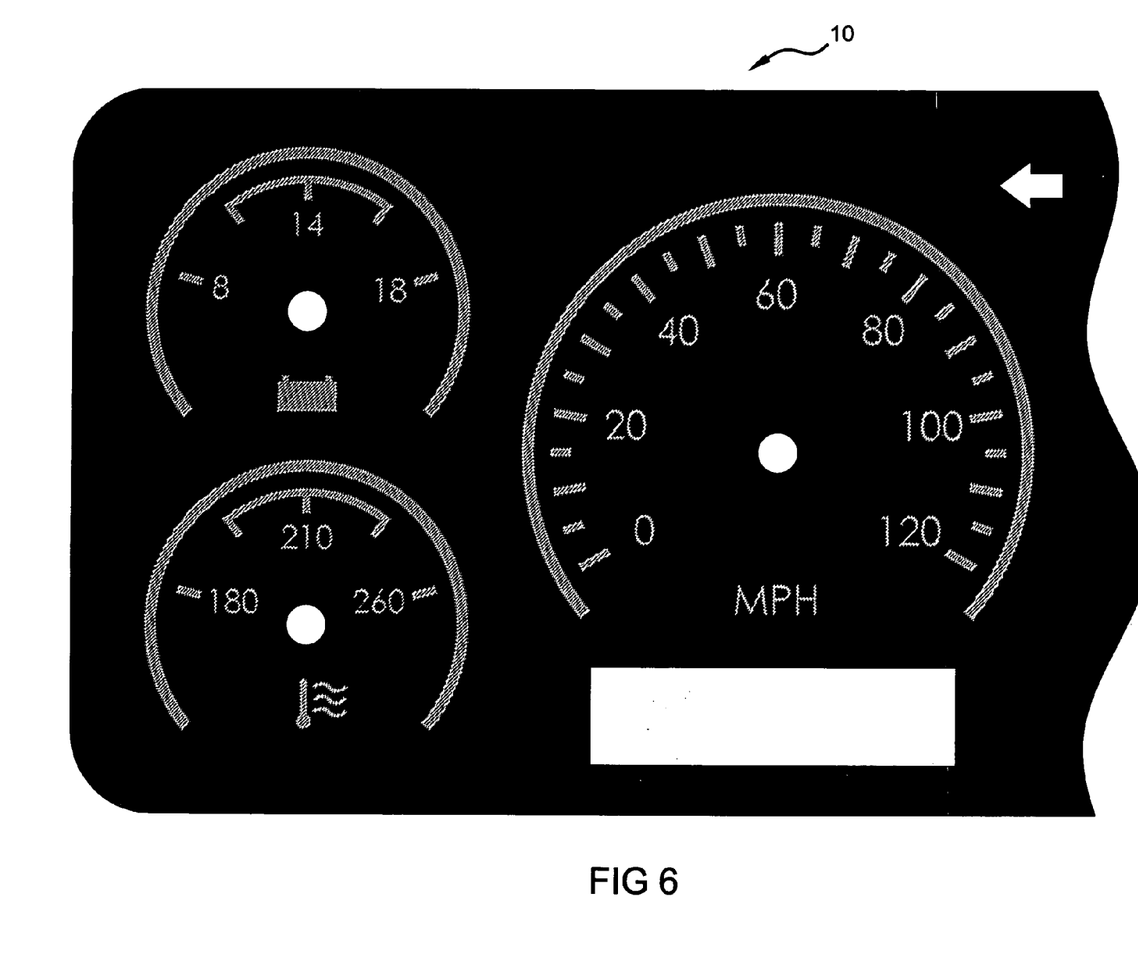
FIG. 6 is a front view of an alternative embodiment of the embroidered instrument cluster constructed in accordance with the teachings of the present invention showing a different contrast between the backing material and the indicia.

In one example, the plurality of indicia 18 may fluoresce or phosphoresce when illuminated by the one or more illumination devices 16 but the backing material 14 may only be illuminated (i.e., not fluoresce or phosphoresce). To that end, the plurality of indicia 18 would glow while the backing material 14 would not, thus providing a contrast between the two. By way of the above example and with reference to FIG. 6, the backing material 14 may be black leather or other suitable fabric having a generally dark appearance. The fibers 44 (FIG. 4) in the plurality of indicia 18 may be white thread (or other suitable contrasting color) that will fluoresce when exposed to white and/or UV light. The one or more illumination devices 16 (FIG. 9) will only illuminate the black leather but the white thread will fluoresce, thus providing the contrast between the two. It will be appreciated that combinations of embroiderable backing material 14 and various types of threads maybe combined in a plurality of combinations such that the backing material 14 and the plurality of fibers made of one or more threads may luminesce, fluoresce, phosphoresce and combinations thereof.

The backing material 14 may be sized to fit any configuration including various configurations of the dashboard 48 (FIG. 1). It will be appreciated the embroidered instrument cluster 10 and the backing material 14 can be coupled to various portions of a vehicle and as such can be sized accordingly. To accommodate the various sizes and configurations of dashboards 48 and other portions of the vehicle, the backing material may be trimmed to size with a laser or other computer-controlled cutting machine (not shown). It will be appreciated that regardless of the mechanism used to size the backing material, the cutting machine used may be computer-controlled to facilitate a large-volume operation.

Figure 5:
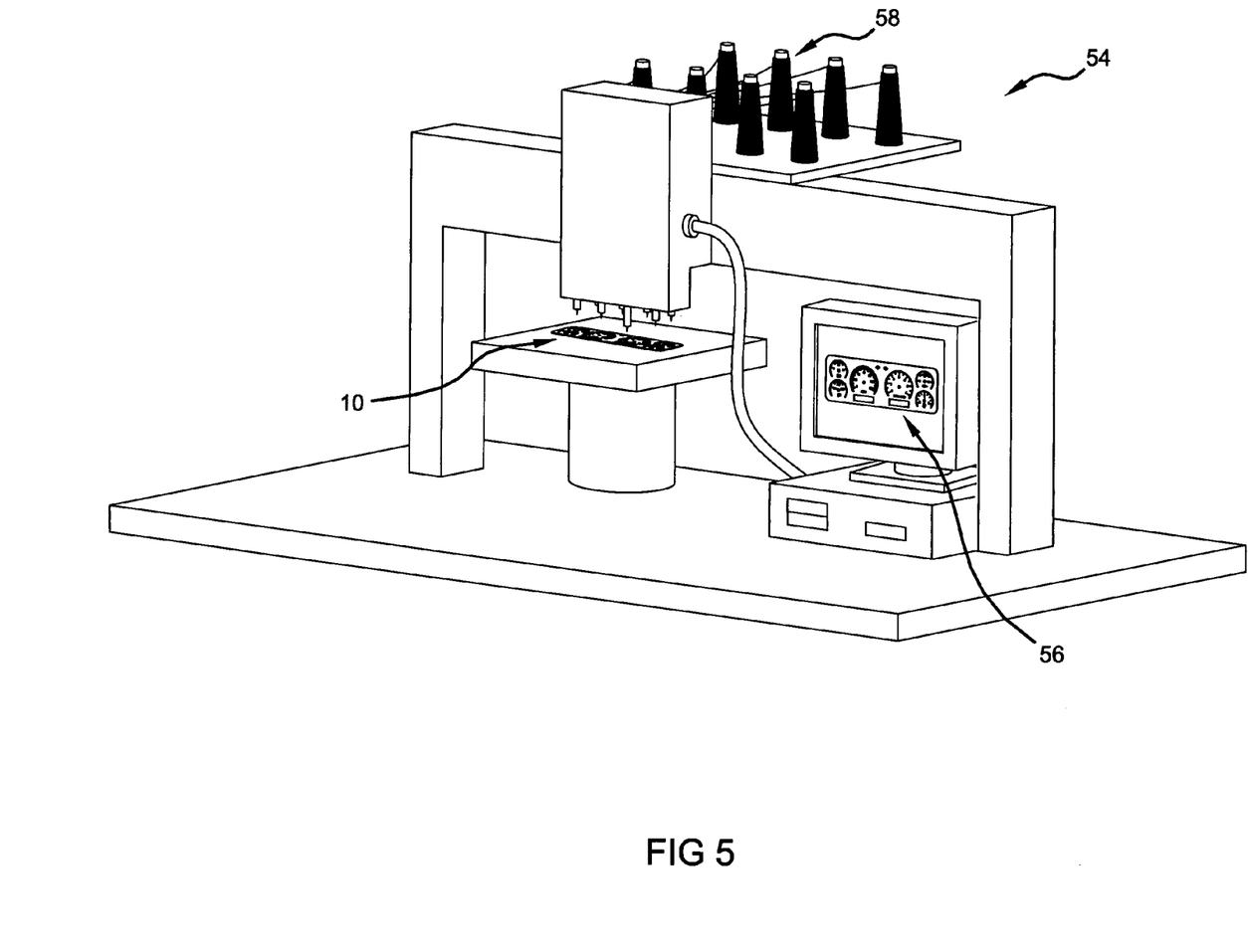
FIG. 5 is a perspective view of an exemplary computer-controlled embroidery machine constructed in accordance with the teachings of the present invention showing fabrication of the embroidered instrument cluster.

With reference to FIG. 5, the plurality of indicia 18 (i.e., the tick marks 20, the characters 22 and/or the borders 24) may be embroidered into the backing material 14 using a computer-controlled embroidery machine 54. The computer-controlled embroidery machine 54 may be pre-programmed with one or more instrument cluster configurations and/or designs 56. The computer-controlled embroidery machine 54 may manipulate multiple spools of thread 58 including multiple types and/or colors of thread while constructing the embroidered instrument cluster 10. The multiple spools of thread 58 may include, for example, red, black, blue and white threads that both specifically fluoresce or phosphoresce and spools of thread of various colors that do not specifically fluoresce or phosphoresce, but still may do so to lesser degree.

The plurality of indicia 18 may be embroidered into the backing material 14 using a computer-controlled embroidery machine 54 but need not include the tick marks 20, the characters 22 and/or the borders 24 that indicate a vehicle parameter. Moreover, the embroidered instrument cluster 10 need not be coupled to the dashboard 48 or portions of the dash panel, but may be used in other areas of the vehicle. In one example, the plurality of indicia may be configured to indicate a transmission gear selected by the driver. In a floor mounted gear selector, for example, the characters that indicate each gear (e.g., "D," "R," "1," "2" etc.) may be embroidered into the backing material 14 and coupled the floor-mounted gear selector. By way of the above example, each of the characters may be selectively illuminated when the transmission gear is selected.

In another example, the plurality of indicia embroidered to a suitable backing material may be coupled to portion of a radio. More specifically, the plurality of indicia may have tick marks indicating a volume level and a volume control knob or the like may be rotated relative thereto. Moreover, characters forming words (or abbreviations of the words) such as volume, channel, tune, bass, fade etc. may me embroidered on the backing material. The backing material and indicia may be attached to a front fascia of the radio. A transparent protective cover may be attached over the backing material 14 and the plurality of threads 44. It will be appreciated that combinations of the embroiderable backing material 14 and various types of threads maybe combined in a plurality of combinations such that the backing material 14 and the plurality of fibers made of one or more threads may luminesce, fluoresce, phosphoresce and combinations thereof.

The description of the present invention is merely exemplary in nature and, thus, variations that do not depart from the gist of the present invention are intended to be within the scope of the present invention. Such variations are not to be regarded as a departure from the spirit and scope of the present invention.

What is claimed is:

1. An instrument cluster comprising:
a housing that forms a periphery of the instrument cluster;
a pointer rotatably connected to said housing, said pointer having a needle portion and a hub portion;
a backing material connected to said housing, said backing material having a front face visible within the instrument cluster, wherein said hub portion extends through said backing material and said needle portion rotates over said backing material;
a plurality of fibers forming indicia that indicate a vehicle parameter, said plurality of fibers embroidered to said backing material, wherein a portion of said indicia is radially disposed about said pointer, said indicia are arranged to be descriptive of an increasing value of said vehicle parameter, wherein said pointer is operable to rotate and point to said indicia to indicate a value of said vehicle parameter;
an illumination device connected to said housing and at least partially positioned in front of said front face, said illumination device illuminates at least one of said front face of said backing material and a portion of said indicia formed by said plurality of fibers on said front face.

2. The instrument cluster of claim 1 wherein said front face of said backing material fluoresces when illuminated by said illumination device.

3. The instrument cluster of claim 1 wherein said front face of said backing material phosphoresces when illuminated by said illumination device.

4. The instrument cluster of claim 1 wherein said plurality of fibers fluoresces when illuminated by said illumination device.

5. The instrument cluster of claim 1 wherein said plurality of fibers phosphoresces when illuminated by said illumination device.

6. The instrument cluster of claim 1 wherein said backing material is made of one of leather, plastic, silk, cotton, cork, wool, satin, wood, velour, velvet, woven wire poly vinyl chloride layers, pleather and combinations thereof.

7. The instrument cluster of claim 1 wherein said illumination device produces ultra-violet light wherein said plurality of fibers fluoresces when illuminated by said illumination device and said illumination device is operable to not illuminate said backing material.

8. The instrument cluster of claim 1 wherein said illumination device includes one of a light-emitting diode, an incandescent bulb, a light-emitting diode, a fluorescent lamp and combinations thereof.

9. The instrument cluster of claim 1 wherein said illumination device includes a plurality of illumination devices coupled to said periphery of of said housing in front of said front face of said backing material.

10. The instrument cluster of claim 1 wherein light from said illumination device is invisible to a human eye.

11. The instrument cluster of claim 1 wherein said portion of said indicia provides a number, a tick mark and a border, said number is adjacent said tick mark, said tick mark is descriptive of said number and said tick mark is disposed between said number and said border.

12. The instrument cluster of claim 1 wherein said plurality of fibers embroidered to a single piece of said backing material form said indicia that provide a plurality of gauges in the instrument cluster.

13. A vehicle instrument cluster comprising:
a backing material made of fabric;
a plurality of fibers forming indicia that indicate a vehicle parameter, said fibers that form said indicia are embroidered on said backing material such that at least one fiber extends
over said front face of said backing material,
through said backing material to a back face of said backing material,
over said back face of said backing material, and
through said backing material to said front face of said backing material, wherein said at least one fiber forms at least one generally one hundred eighty degree bend around said backing material;
a pointer that is rotatable to selectively point to one of said indicia, wherein a portion of said indicia are radially disposed about said pointer and arranged to be descriptive of an increasing value of said vehicle parameter, wherein said pointer is operable to indicate a value of said vehicle parameter when said pointer points to one of said indicia.

14. The vehicle instrument cluster of claim 13 further comprising an illumination device that illuminates at least one of said front face of said backing material and said indicia, wherein at least one of said front face of said backing material and said indicia fluoresces when illuminated by said illumination device.

15. The vehicle instrument cluster of claim 14 wherein said illumination device produces ultra-violet light.

16. The vehicle instrument cluster of claim 14 wherein said illumination device includes one of a light-emitting diode, an incandescent bulb, a light-emitting diode, a fluorescent lamp and combinations thereof.

17. The vehicle instrument cluster of claim 13 wherein said backing material is made of one of leather, silk, cotton, wool, satin, velour, velvet, woven wire poly vinyl chloride layers, pleather and combinations thereof.

18. An instrument cluster having an illumination device that emits light, the instrument cluster comprising:
a housing that forms a periphery of the instrument cluster, said housing connected to a dashboard in a vehicle;
a backing material made of one of cloth and leather, said backing material connected to said housing;
indicia formed of a plurality of threads embroidered to said backing material with an embroidery stitch;
a pointer rotatably connected to said housing, said pointer having a needle portion and a hub portion,
wherein a portion of said indicia is radially disposed about said pointer, said indicia are arranged to be descriptive of an increasing value of a vehicle parameter, wherein said pointer is operable to rotate and point to said indicia to indicate a value of said vehicle parameter, wherein one of a front face of said backing material and said indicia on said front face of said backing material fluoresce due to the light contacting said front face of said backing material from the illumination device, wherein all of said indicia on said backing material are viewable from within said vehicle.

19. An instrument cluster comprising:
a housing that forms a periphery of the instrument cluster;
a single piece of backing material made of one of cloth and leather connected to said housing;
indicia formed of a plurality of threads embroidered to said single piece of backing material, said indicia representing a scale descriptive of values associated with a vehicle parameter;
an illumination device that directs light to a front face of said single piece of backing material that causes one of said front face of said single piece of backing material and a portion of said indicia on said front face to fluoresce; and
a pointer that is rotatable to selectively point to one of said indicia on said scale to indicate a value of said vehicle parameter, wherein a portion of said indicia is radially disposed about said pointer.

20. A method of providing a gauge in a vehicle with a pointer that indicates a value of a vehicle parameter associated with the gauge, the method comprising:
providing a housing operable to contain an instrument cluster in a vehicle;
providing a single piece of backing material made of one of cloth and leather;
embroidering a plurality of threads into said backing material to form indicia that indicate a vehicle parameter, wherein said embroidering includes radially disposing a portion of said indicia about said pointer and arranging said portion of said indicia to be descriptive of an increasing value of the vehicle parameter;
connecting said single piece of backing material to said housing to be viewable from within the vehicle;
illuminating a front face of said backing material and a portion of said plurality of threads on said front face, wherein said illuminating includes causing one of said portion of said indicia on said front face and said front face of said backing material to fluoresce.

21. The method of claim 20 further comprising laser-cutting said backing material.

22. The method of claim 20 further comprising providing a computer-controlled embroidery machine and programming said embroidery machine with an instrument cluster design.

* * * * *